(12) United States Patent
Egolf et al.

(10) Patent No.: US 10,052,603 B2
(45) Date of Patent: Aug. 21, 2018

(54) SCALLOP ASSEMBLY AND REACTOR

(71) Applicant: UOP LLC, Des Plaines, IL (US)

(72) Inventors: Bryan J. Egolf, Crystal Lake, IL (US); Jeffrey Grott, Chicago, IL (US); Emadoddin Abbasi, Oak Park, IL (US); Michael J. Vetter, Schaumburg, IL (US); Ka Lok, Buffalo Grove, IL (US)

(73) Assignee: UOP LLC, Des Paines, IL (US)

( * ) Notice: Subject to any disclaimer, the term of this patent is extended or adjusted under 35 U.S.C. 154(b) by 0 days.

(21) Appl. No.: 15/582,281

(22) Filed: Apr. 28, 2017

(65) Prior Publication Data

US 2017/0320033 A1    Nov. 9, 2017

Related U.S. Application Data

(60) Provisional application No. 62/332,515, filed on May 6, 2016.

(51) Int. Cl.
| | | |
|---|---|---|
| *B01J 8/00* | (2006.01) | |
| *B01J 8/02* | (2006.01) | |
| *B01J 19/00* | (2006.01) | |
| *B01J 19/24* | (2006.01) | |

(52) U.S. Cl.
CPC .... *B01J 8/0278* (2013.01); *B01J 2208/00884* (2013.01); *B01J 2208/00893* (2013.01)

(58) Field of Classification Search
CPC ..... B01J 8/00; B01J 8/02; B01J 8/0278; B01J 2208/00796; B01J 2208/00884; B01J 2208/00893; B01J 19/00; B01J 19/24; B01J 2219/24

See application file for complete search history.

(56) References Cited

U.S. PATENT DOCUMENTS

| | | |
|---|---|---|
| 5,366,704 A | 11/1994 | Koves et al. |
| 6,224,838 B1 | 5/2001 | Schulz et al. |
| 7,226,568 B1 | 6/2007 | Ham et al. |
| 7,829,038 B2 | 11/2010 | Vetter et al. |
| 8,759,600 B2 | 6/2014 | Sun et al. |
| 2008/0107575 A1* | 5/2008 | Vetter .................. B01J 8/0085 422/211 |
| 2013/0221123 A1 | 8/2013 | Oshinowo et al. |

FOREIGN PATENT DOCUMENTS

CN           104650961           5/2015

OTHER PUBLICATIONS

Search Report dated Aug. 17, 2017 for corresponding PCT Appl. No. PCT/US2017/029291.

* cited by examiner

*Primary Examiner* — Natasha E Young

(57) ABSTRACT

A radial flow reactor is described. It includes a vertically extending vessel, an outer conduit, and a central conduit. At least a portion of the outer conduit and the central conduit comprises a screen. A particle retaining space is defined by at least one of the vessel, the central conduit, and the outer conduit, and it communicates with the screen of the outer conduit and the central conduit. An inlet distribution ring is positioned on the outer conduit. The inlet distribution ring comprises a ring having at least one opening and at least one vertically extending riser tube. One end of the riser tube is sealed to the ring, and the other end is positioned inside the outer conduit.

20 Claims, 2 Drawing Sheets

SCALLOP ASSEMBLY AND REACTOR

CROSS-REFERENCE TO RELATED APPLICATION

This application claims priority from Provisional Application No. 62/332,515 filed May 6, 2016, the contents of which cited application are hereby incorporated by reference in its entirety.

BACKGROUND OF THE INVENTION

The invention relates to the internals for a radial flow reactor. A radial flow reactor includes devices for retaining catalyst or adsorbent in a space within a reactor, and devices for the inlet and outlet flow of fluid across the catalyst or adsorbent.

A wide variety of processes use radial flow reactors to provide for contact between a fluid and a solid. The solid usually comprises a catalytic material on which the fluid reacts to form a product, or an adsorbent for selectively removing a component from the fluid. The processes cover a range of processes, including hydrocarbon conversion, gas treatment, and adsorption for separation.

Radial flow reactors are constructed such that the reactor has an annular structure and that there are annular distribution and collection devices. The devices for distribution and collection incorporate some type of screened surface. The screened surface is for holding catalyst or adsorbent beds in place and for aiding in the distribution of pressure over the surface of the reactor, or adsorber, and to facilitate radial flow through the reactor bed. The screen can be a mesh, either wire or other material, or a punched plate. For a moving bed, the screen or mesh provides a barrier to prevent the loss of solid catalyst particles while allowing fluid to flow through the bed. The screen requires that the holes for allowing fluid through are sufficiently small to prevent the solid from flowing across the screen. Solid catalyst particles are added at the top, and flow through the apparatus and removed at the bottom, while passing through a screened-in enclosure that permits the flow of fluid over the catalyst. The screen is preferably constructed of a non-reactive material, but in reality the screen often undergoes some reaction through corrosion, and over time problems arise from the corroded screen or mesh.

The screens or meshes used to hold the catalyst particles within a bed are sized to have apertures sufficiently small that the particles cannot pass through. The outer screen element can be provided by a cylindrical screen that retains particles in its interior, and provides for the distribution of fluid through the space between the screen and the outer wall of the reactor. Another design for an outer screen element is to use a plurality of oblong conduits arrayed around the wall of the reactor. A common shape for the oblong conduits is a scallop shaped cross-section where the flattened side is positioned against the wall of the reactor and the more sharply curved side presents a screened face that allows the catalyst to flow against, while fluid flows within the oblong conduit and passes through the screened face. The flattened side is shaped to substantially conform to the curve of the reactor wall to minimize volume between the conduits and the reactor wall.

The common type scallop design can be found in U.S. Pat. Nos. 5,366,704 and 6,224,838, where the scallops have either punched plates or longitudinally extended profile wire arrangements, respectively.

A significant fabrication and maintenance concern for scallop designs is the accommodation of differential thermal growth between the reactor shell and the scallop internals. This is accomplished in conventional scallops using a machined riser with a machined seal plate that has a gap allowing for independent movement of the two components.

FIG. 1 illustrates one embodiment of a radial flow reactor 100 with a typical design for the scallop 105. The outer conduit 110 has a back wall 115 which is adjacent to the vessel wall 120. At least a portion of the front side 125 of the outer conduit 110 comprises a screen section 130 (e.g., a wire arrangement or perforated plate, or the like) and a solid section 135. The outer conduit 110 rests on the outer conduit bottom support 137.

There is a central conduit 140 which has a front side 145, including a screen section 150 and a solid section 155.

Between the front side 125 of the outer conduit 110 and the front side 145 of the central conduit 140 is the catalyst bed 160. The shape of the catalyst bed 160 depends on the shape of the outer conduit 110 and central conduit 140.

The riser tube 165 is attached to the outer conduit 110, typically by welding forming a single piece.

The inlet vapor flows through a riser tube 165 into outer conduit 110, through the catalyst bed 160, and out through the central conduit 140.

There is a scallop support ring 170 with a seal plate 175 on it. The riser tube 165 is positioned in an opening in the seal plate 175. The seal plate gap 180 between the seal plate 175 and the riser tube 165 is set quite narrow, e.g., about 1 mm (which is smaller than a catalyst pill) to ensure near isolation of the regions for both hydraulic and catalyst containment. There is a much larger support ring gap 185, e.g., about 13 mm, between the scallop support ring 170 and the riser tube 165. The support ring gap 185 is set by the installation guidelines for the scallops.

This design also includes a small seal gas flow (e.g., about 1% to about 5% of the incoming gas) into a seal vent basket 190 attached to cover plates 191. The purpose of the seal gas is to ensure there is a downward vapor flow through the seal catalyst 195 to prevent uplift of the catalyst from the inlet vapor flow flowing through the seal catalyst at 195 the top of the catalyst bed 160. The seal vent basket 190 is carefully sized to control the 1%-5% flow into it.

In FIG. 1, pressure P1 is upstream of the riser tube 165, and pressure P2 is between the scallop support ring 170 and the top of the seal catalyst 195. P1 is larger than P2, and the difference between P1 and P2 can be about 7 kPa (1 psi). The reason for this pressure differential is the pressure drop through the riser tube 165. This pressure drop is the driving force for the vapor bypass in FIG. 1. The larger the pressure drop is, the greater the driving force for vapor bypass will be.

If the seal plate 175 fails, and the seal plate gap 180 increases above 1 mm, two problems may occur. One is that some of the inlet vapor flow may bypass the riser tube 165 and jet down onto the top of the seal catalyst 195. The increased vapor flow can cause fluidization of the seal catalyst 195 and can lead to plugging of the screen section 130 of the outer conduit 110 and/or the screen section 150 of the central conduit 140 which may require shutting the unit down to remove the catalyst fines.

The second consequence is that fluidized catalyst may enter the seal plate gap 180 and then either plug the seal vent basket 190 and/or fill up the outer conduit 110, either of which will negatively affect the reactor performance and potentially cause a unit shutdown.

Another problem with this design is that the scallop 105 and seal plate 175 can be difficult to install. The riser tube 165 and the outer conduit 110 have to be aligned with a hole in the scallop support ring 170 having a clearance of about 13 mm. Then the seal plate 175, which has about a 1 mm clearance, must be installed and tack welded in place. This installation process can be difficult because the outer conduit 110 can weigh up to 227 kg (500 lb.) and be 15.2 m (50 ft.) long. In addition, the outer conduits 110 are sometimes slightly warped, and the vessel can be out of round. As a result, there is little margin for error in the installation for this design.

Therefore, there is a need for an improved design for the outer conduit and radial flow reactor using them.

SUMMARY OF THE INVENTION

One aspect of the invention is a radial flow reactor. The radial flow reactor includes a vertically extending vessel having a fluid inlet and a fluid outlet, and at least one vertically extending outer conduit in the vessel, at least a portion of the outer conduit comprising a screen defining a plurality of perforations and communicating with the fluid inlet. There is a central conduit which communicates with the fluid outlet, and at least a portion of the central conduit comprises a screen defining a plurality of perforations. A particle retaining space in the vessel is defined by at least one of the vessel, the central conduit, and the outer conduit, and the particle retaining space communicates with the screen of the outer conduit and the screen of the central conduit. There is an inlet distribution ring positioned on the outer conduit which communicates with the fluid inlet. The inlet distribution ring comprises a ring having at least one opening and at least one vertically extending riser tube. One end of the riser tube is sealed to the ring, the other end of the riser tube is positioned inside the outer conduit. There is a first gap between the riser tube and the outer conduit.

DETAILED DESCRIPTION OF THE INVENTION

Figure 1:
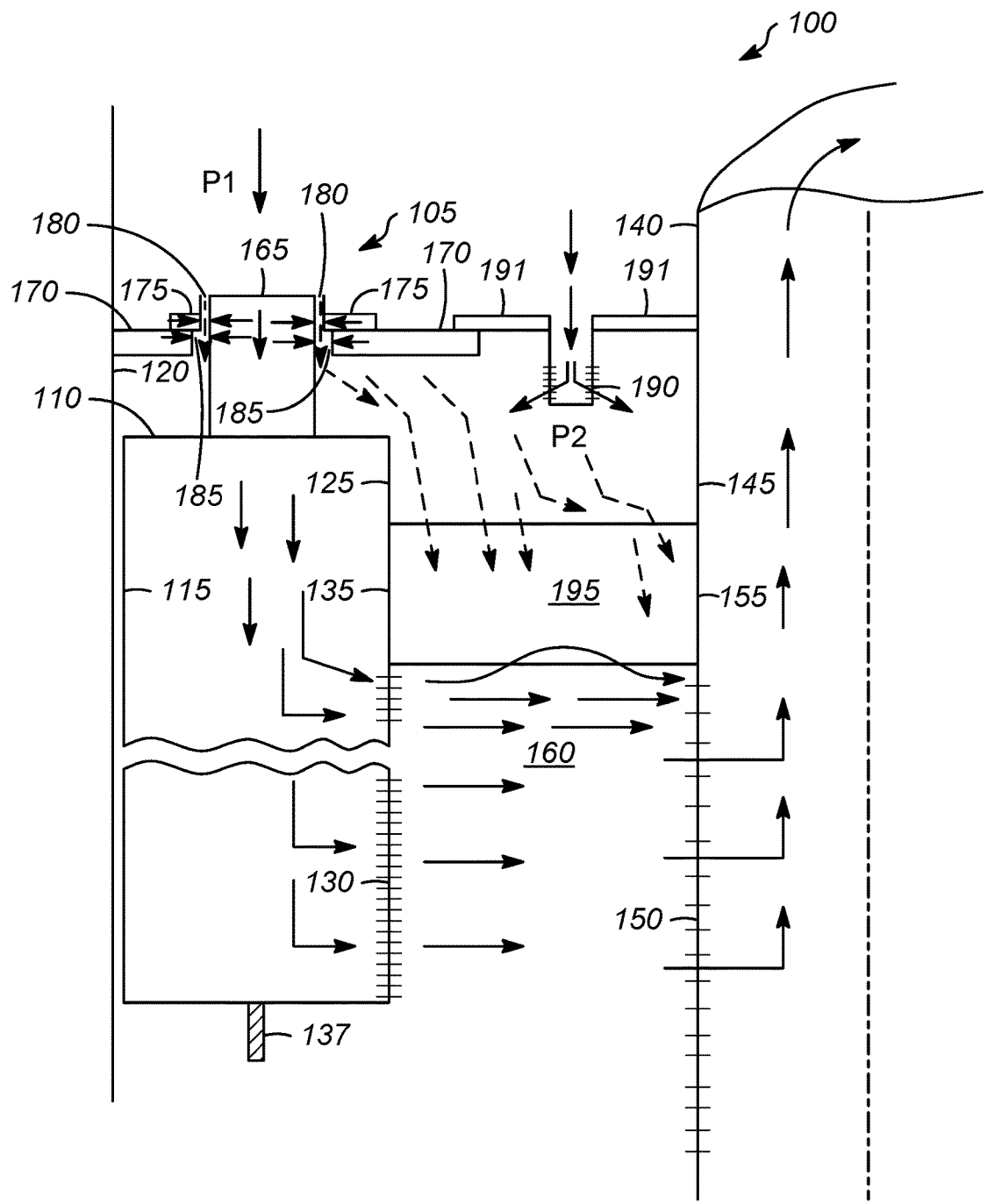
FIG. 1 is an illustration of one embodiment of a prior art radial flow reactor.

The present invention is applicable to any radial flow system for fluid-solid contacting, but in particular for radial flow reactors. Radial flow reactors include fixed bed reactors, and moving bed reactors. As hereinafter used, the term reactor shall be deemed to mean any fluid-solid contacting apparatus, and catalyst bed to mean any bed of solid particulate matter, whether a catalyst or adsorbent.

The vertically extending vessel has a fluid inlet and an outlet. There is at least one vertically extending outer conduit in the vessel. At least a portion of the outer conduit comprises a screen defining a plurality of perforations which communicates with the fluid inlet.

There is central conduit which communicates with the fluid outlet. At least a portion of the central conduit comprises a screen defining a plurality of perforations. There is a particle retaining space defined by at least one of the vessel, the central conduit, and the outer conduit and which communicates with the screens of the outer conduit and the central conduit.

An inlet distribution ring is positioned on the outer conduit and communicates with the fluid inlet. The inlet distribution ring comprises a ring with at least one opening and at least one vertically extending riser tube. One end of the riser tube is sealed to the ring, and the other end is positioned inside the outer conduit. There is a gap between the riser tube and the outer conduit. The seal prevents vapor flow between the riser tube and the ring of the inlet distribution ring. The riser tube can be sealed to the ring by any suitable method including, but not limited to, welding or bolting. If bolting is used, there can be an optional gasket between the ring and the riser tube.

The ring of the inlet distribution ring is attached to the vessel wall. In some embodiments, the ring is a portion of an inlet baffle. The inlet baffle comprises a chamber around the vessel with a bottom plate supporting the riser tube, a top plate, and an inner plate between the bottom and top plates. The bottom and top plates are attached to the vessel wall. The inlet baffle guides the incoming vapor into the riser tube.

In some embodiments, there is a seal plate surrounding the riser tube. The seal plate is in contact with the upper end of the outer conduit. In some embodiments, the seal plate is connected to the outer conduit. Any suitable form of connection can be used including, but not limited to, welding, and bolting with an optional gasket. In other embodiments, the seal plate is a separate piece and is not connected to the outer conduit. Having the seal plate be a separate piece is advantageous because it allows the seal plate to be removed without having to remove the outer conduit. There is a gap between the seal plate and the riser tube. In some embodiments, the gap between the riser tube and the seal plate is smaller than the gap between the riser tube and the outer conduit.

The separate seal plate design can be used with a variety of outer conduit designs including, but not limited to, scallops, trapezoidal, rectangular, D-shaped, and cylindrical. Suitable scallops are available including punched plate D-Shaped scallops, OptiMiser® Scallops (available from Bilfinger Water Technologies), and CatMax Scallops (available from UOP LLC). In some designs, the outer conduit can be vertically tapered (e.g., one end of the outer conduit is larger than the other end).

The outer conduit screens can be profile wire screen, wire mesh, a plate having apertures, louvers, or combinations thereof.

The central conduit screen can be profile wire screen, wire mesh, a plate having apertures, louvers, or combinations thereof.

The lengths of the screen portions of the outer conduit and the central conduit are independent of one another. As a result, in some embodiments, the screen portions of the outer conduit and central conduit may be offset from each other.

Figure 2:
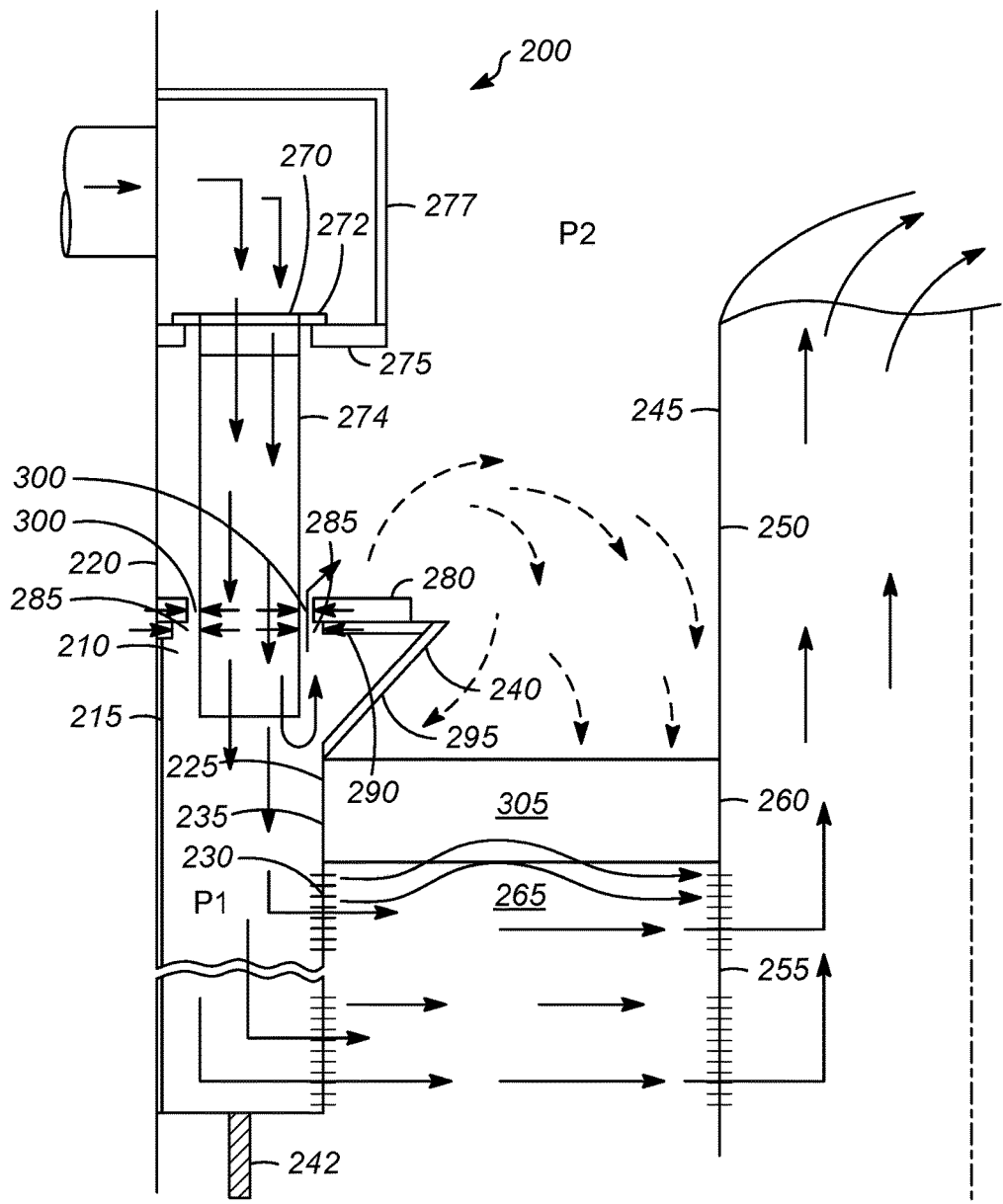
FIG. 2 is an illustration of one embodiment of a radial flow reactor according to the present invention.

FIG. 2 is an illustration of one embodiment of a reactor 200. The outer conduit 210 has a back wall 215 which is adjacent to the vessel wall 220. The front side 225 of the outer conduit 210 comprises a screen section 230, a solid section 235, and a sealing section 240. The outer conduit 210 is in fluid communication with the fluid inlet of the reactor 200. The screen section 230 can comprise profile wire screen, wire mesh, a plate having apertures, louvers, or combinations thereof. The screens are typically substantially planar; however, screens having a curvature to conform to the curvature of the reactor can also be used. The outer conduit 210 rests on the outer conduit bottom support 242.

The central conduit 245 has a front side 250 including a screen section 255 and a solid section 260. The screen section 255 can comprise a profile wire screen, wire mesh, a plate having apertures, louvers, or combinations thereof. The central conduit 245 is in fluid communication with the fluid outlet of the reactor 200.

The catalyst bed 265 is defined by the volume between the front side 225 of the outer conduit 210 and the front side 250 of the central conduit 245.

The inlet distribution ring 270 comprises a ring 272 with an opening and a riser tube 274. The top of the riser tube 274 is sealed to the ring 272, typically by welding. The seal does not allow vapor to escape between the ring 272 and the riser tube 274.

The ring 272 of the inlet distribution ring 270 is attached to the deck 275, typically by welding. As shown, the deck 275 is the bottom of the inlet baffle 277, which includes side and top walls. The riser tube 274 extends into the outer conduit 210. The bottom of the riser tube 274 is below the top of the outer conduit 210.

The seal plate 280 is attached to the sealing section 240 of the front side 225 of the outer conduit 210. As illustrated, the sealing section 240 includes a horizontal portion 290 to which the seal plate 280 is attached and an intermediate portion 295. The intermediate portion 295 connects the solid section 235 and the horizontal portion 290. As shown, the intermediate portion 295 forms an angle with respect to the solid section 235 and an angle with respect to the horizontal portion 290. However, other arrangements could be used for the sealing section 240. For example, the front side 225 could extend upward, and the seal plate could be attached directly to the top of the front side 225, or to a plate attached to the top of the front side 225.

The seal plate 280, which is larger than existing seal plates, and the horizontal portion 290 of the sealing section 240 provide a larger area for attachment, which makes attachment by welding easier.

The inlet vapor flows downward through the riser tube 274 into the outer conduit 210. It flows through the catalyst bed 265 and out through the central conduit 245.

Because the ring 272 of the inlet distribution ring 270 is attached to the deck 275, the vapor flows into the riser tube 274, and does not bypass it.

There is a gap 285 between the riser tube 274 and the outer conduit 210, which is generally about 13 mm. The bottom of the riser tube 274 is inside the outer conduit 210. Because the inlet vapor is traveling downward at high velocity, most of it will continue downward. In order to escape through the gap 285, the inlet vapor would have change direction after exiting the riser tube 274 inside the outer conduit 210 and travel upward to reach the gap 285. Thus, very little of the inlet vapor will flow through the gap 285.

When the seal plate 280 is present, the gap 300 between the riser tube 274 and the seal plate 280 is smaller than the gap 285 between the riser tube 274 and the outer conduit 210.

The length of the screen section 230 of the outer conduit 210 is independent of the length of the screen section 255 of the central conduit 245. Also, the length of the solid section 235 is independent of the length of the solid section 260. In either case, they can be longer, shorter, or the same length.

In some embodiments, the front side 225 of the outer conduit 210 does not extend to the bottom of the reactor 200. Instead, the bottom of the outer conduit 210 is open, which allows some gas to flow and contact the catalyst. The open bottom allows catalyst fines that can pass through the screen section 230 to flow down, be collected with the catalyst particles, and exit the reactor 200 with the catalyst particles. The fines can be separated from the catalyst during regeneration of the catalyst.

In FIG. 2, pressure P1 is downstream of the riser tube 274, and pressure P2 is above the seal catalyst 305. Therefore, pressure drop is relatively small (e.g., about 0.7 kPa (0.1 psi)) because it does not include the riser tube pressure drop isolating the pressure upstream of the riser tube since the riser tube 274 is seal welded to the ring 272 of the inlet distribution ring 270. The present design can have one or more advantages over existing designs (not all advantages listed below are necessarily present in all embodiments). The main advantage is hydraulic, where the location behind a region of high vapor momentum combines with the lower pressure drop across the seal gap to enable a novel hydraulic control over the direction of flow through the gap. The riser design now balances suction from the high momentum riser vapors against the pressure drop of gases passing across the seal catalyst 305. This design resilience allows field installations to be simpler, faster, and more reliable. For example, the outer conduit can be easily put into place on the outer conduit bottom support without the need for fine alignment. The riser tube can then be easily slipped down into the outer conduit, and the seal plate welded in place. Also, in some embodiments the new seal plate location allows for a larger seal plate which will make the welding easier and/or better. The seal plate rests on top of the outer conduit, and the size of the outer conduit is not limited in size as it is in FIG. 1 because of the presence of the cover plates 191.

Another difference is that the change in pressure between the region above the seal catalyst (P2) and the region just upstream of the seal plate (P1) is much less in this new design (about 0.7 kPa (0.1 psi) vs up to about 7 kPa (1 psi)) (see FIGS. 1 and 2).

The lower pressure change means there is less driving force to cause vapor bypass through the gap between the riser tube and the outer conduit (or the seal plate). The reduced vapor bypass reduces or eliminates the possibility of fluidizing the seal catalyst and the chance that the unit will shut down due to a plugged central conduit.

While the invention has been described with what are presently considered the preferred embodiments, it is to be understood that the invention is not limited to the disclosed embodiments, but it is intended to cover various modifications and equivalent arrangements included within the scope of the appended claims.

Specific Embodiments

While the following is described in conjunction with specific embodiments, it will be understood that this description is intended to illustrate and not limit the scope of the preceding description and the appended claims.

A first embodiment of the invention is a reactor comprising a vertically extending vessel having a fluid inlet and a fluid outlet; at least one vertically extending outer conduit in the vessel, at least a portion of the outer conduit comprising a screen defining a plurality of perforations and communicating with the fluid inlet; a central conduit communicating with the fluid outlet, at least a portion of the central conduit comprising a screen defining a plurality of perforations; a particle retaining space in the vessel defined by at least one of the vessel, the central conduit, and the outer conduit, the particle retaining space communicating with the screen of the outer conduit and the screen of the central conduit; an inlet distribution ring positioned on the outer conduit and communicating with the fluid inlet, the inlet distribution ring comprising a ring having at least one opening and at least one vertically extending riser tube, one end of the riser tube sealed to the ring, the other end of the riser tube positioned inside the outer conduit; wherein there is a first gap between the riser tube and the outer conduit. An embodiment of the invention is one, any or all of prior embodiments in this paragraph up through the first embodiment in this paragraph wherein the riser tube is sealed to the ring by a weld, or a bolt with an optional gasket. An embodiment of the invention is one, any or all of prior embodiments in this paragraph up through the first embodiment in this paragraph wherein the ring is supported by a deck extending at least a portion of the distance between a vessel wall and the central conduit. An embodiment of the invention is one, any or all of prior embodiments in this paragraph up through the first embodiment in this paragraph wherein the deck comprises a portion of an inlet baffle. An embodiment of the invention is one, any or all of prior embodiments in this paragraph up through the first embodiment in this paragraph further comprising a seal plate surrounding the riser tube at one end of the outer conduit. An embodiment of the invention is one, any or all of prior embodiments in this paragraph up through the first embodiment in this paragraph wherein the seal plate is in contact with the outer conduit. An embodiment of the invention is one, any or all of prior embodiments in this paragraph up through the first embodiment in this paragraph wherein the seal plate is separate from the outer conduit. An embodiment of the invention is one, any or all of prior embodiments in this paragraph up through the first embodiment in this paragraph wherein there is a second gap between the riser tube and the seal plate, and wherein the second gap is smaller than the first gap. An embodiment of the invention is one, any or all of prior embodiments in this paragraph up through the first embodiment in this paragraph wherein at least one outer conduit has a shape selected from scallop, trapezoidal, rectangular, D-shaped, and cylindrical. An embodiment of the invention is one, any or all of prior embodiments in this paragraph up through the first embodiment in this paragraph wherein at least one outer conduit is vertically tapered. An embodiment of the invention is one, any or all of prior embodiments in this paragraph up through the first embodiment in this paragraph wherein the screen of the outer conduit comprises a profile wire screen, wire mesh, a plate having apertures, louvers, or combinations thereof. An embodiment of the invention is one, any or all of prior embodiments in this paragraph up through the first embodiment in this paragraph wherein the screen of the central conduit comprises a profile wire screen, wire mesh, a plate having apertures, louvers, or combinations thereof. An embodiment of the invention is one, any or all of prior embodiments in this paragraph up through the first embodiment in this paragraph wherein a length of the screen of the outer conduit is different from a length of the screen of the central conduit.

A second embodiment of the invention is a reactor comprising a vertically extending vessel having a fluid inlet and a fluid outlet; at least one vertically extending outer conduit in the vessel, at least a portion of the outer conduit comprising a screen defining a plurality of perforations and communicating with the fluid inlet; a central conduit communicating with the fluid outlet, at least a portion of the central conduit comprising a screen defining a plurality of perforations; a particle retaining space in the vessel defined by at least one of the vessel, the central conduit, and the outer conduit, the particle retaining space communicating with the plurality of perforations and the central conduit; an inlet distribution ring positioned on the outer conduit and communicating with the fluid inlet, the inlet distribution ring comprising a ring having at least one opening and at least one vertically extending riser tube, one end of the riser tube sealed to the ring, the other end of the riser tube positioned inside the outer conduit; a seal plate in contact with the outer conduit; wherein there is a first gap between the riser tube and the outer conduit, and a second gap between the riser tube and the seal plate, and wherein the second gap is smaller than the first gap. An embodiment of the invention is one, any or all of prior embodiments in this paragraph up through the second embodiment in this paragraph wherein the ring of the inlet distribution ring is supported by a deck extending at least a portion of the distance between a vessel wall and the central conduit. An embodiment of the invention is one, any or all of prior embodiments in this paragraph up through the second embodiment in this paragraph wherein the seal plate is separate from the outer conduit. An embodiment of the invention is one, any or all of prior embodiments in this paragraph up through the second embodiment in this paragraph wherein at least one outer conduit has a shape selected from scallop, trapezoidal, rectangular, D-shaped, and cylindrical. An embodiment of the invention is one, any or all of prior embodiments in this paragraph up through the second embodiment in this paragraph wherein at least one outer conduit is vertically tapered. An embodiment of the invention is one, any or all of prior embodiments in this paragraph up through the second embodiment in this paragraph wherein the screen of the outer conduit, the screen of the central conduit, or both, comprises a profile wire screen, wire mesh, a plate having apertures, louvers, or combinations thereof. An embodiment of the invention is one, any or all of prior embodiments in this paragraph up through the second embodiment in this paragraph wherein a length of the screen of the outer conduit is different from a length of the screen of the central conduit.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. A radial flow reactor comprising:
a vertically extending vessel having a fluid inlet and a fluid outlet;
at least one vertically extending outer conduit in the vessel, at least a portion of the outer conduit comprising a screen defining a plurality of perforations and communicating with the fluid inlet;
a central conduit communicating with the fluid outlet, at least a portion of the central conduit comprising a screen defining a plurality of perforations;
a particle retaining space in the vessel defined by at least one of the vessel, the central conduit, and the outer conduit, the particle retaining space communicating with the screen of the outer conduit and the screen of the central conduit;

an inlet distribution ring positioned on the outer conduit and communicating with the fluid inlet, the inlet distribution ring comprising a ring having at least one opening and at least one vertically extending riser tube, one end of the riser tube sealed to the ring, the other end of the riser tube positioned inside the outer conduit;

wherein there is a first gap between the riser tube and the outer conduit.

2. The reactor of claim 1 wherein the riser tube is sealed to the ring by a weld, or a bolt with an optional gasket.

3. The reactor of claim 1 wherein the ring is supported by a deck extending at least a portion of a distance between a vessel wall and the central conduit.

4. The reactor of claim 3 wherein the deck comprises a portion of an inlet baffle.

5. The reactor of claim 1 further comprising a seal plate surrounding the riser tube at one end of the outer conduit.

6. The reactor of claim 5 wherein the seal plate is in contact with the outer conduit.

7. The reactor of claim 5 wherein the seal plate is separate from the outer conduit.

8. The reactor of claim 5 wherein there is a second gap between the riser tube and the seal plate, and wherein the second gap is smaller than the first gap.

9. The reactor of claim 1 wherein at least one outer conduit has a shape selected from scallop, trapezoidal, rectangular, D-shaped, and cylindrical.

10. The reactor of claim 1 wherein at least one outer conduit is vertically tapered.

11. The reactor of claim 1 wherein the screen of the outer conduit comprises a profile wire screen, wire mesh, a plate having apertures, louvers, or combinations thereof.

12. The reactor of claim 1 wherein the screen of the central conduit comprises a profile wire screen, wire mesh, a plate having apertures, louvers, or combinations thereof.

13. The reactor of claim 1 wherein a length of the screen of the outer conduit is different from a length of the screen of the central conduit.

14. A radial flow reactor comprising:
a vertically extending vessel having a fluid inlet and a fluid outlet;
at least one vertically extending outer conduit in the vessel, at least a portion of the outer conduit comprising a screen defining a plurality of perforations and communicating with the fluid inlet;
a central conduit communicating with the fluid outlet, at least a portion of the central conduit comprising a screen defining a plurality of perforations;
a particle retaining space in the vessel defined by at least one of the vessel, the central conduit, and the outer conduit, the particle retaining space communicating with the plurality of perforations and the central conduit;
an inlet distribution ring positioned on the outer conduit and communicating with the fluid inlet, the inlet distribution ring comprising a ring having at least one opening and at least one vertically extending riser tube, one end of the riser tube sealed to the ring, the other end of the riser tube positioned inside the outer conduit;
a seal plate in contact with the outer conduit;
wherein there is a first gap between the riser tube and the outer conduit, and a second gap between the riser tube and the seal plate, and wherein the second gap is smaller than the first gap.

15. The reactor of claim 14 wherein the ring of the inlet distribution ring is supported by a deck extending at least a portion of the distance between a vessel wall and the central conduit.

16. The reactor of claim 14 wherein the seal plate is separate from the outer conduit.

17. The reactor of claim 14 wherein at least one outer conduit has a shape selected from scallop, trapezoidal, rectangular, D-shaped, and cylindrical.

18. The reactor of claim 14 wherein at least one outer conduit is vertically tapered.

19. The reactor of claim 14 wherein the screen of the outer conduit, the screen of the central conduit, or both, comprises a profile wire screen, wire mesh, a plate having apertures, louvers, or combinations thereof.

20. The reactor of claim 14 wherein a length of the screen of the outer conduit is different from a length of the screen of the central conduit.

* * * * *